US012339429B2

(12) United States Patent
Kato

(10) Patent No.: US 12,339,429 B2
(45) Date of Patent: Jun. 24, 2025

(54) IMAGE CAPTURE SYSTEM

(71) Applicant: SCREEN HOLDINGS CO., LTD., Kyoto (JP)

(72) Inventor: Keisuke Kato, Kyoto (JP)

(73) Assignee: SCREEN Holdings Co., Ltd., Kyoto (JP)

(*) Notice: Subject to any disclaimer, the term of this patent is extended or adjusted under 35 U.S.C. 154(b) by 399 days.

(21) Appl. No.: 18/013,420

(22) PCT Filed: Jun. 2, 2021

(86) PCT No.: PCT/JP2021/020972
§ 371 (c)(1),
(2) Date: Dec. 28, 2022

(87) PCT Pub. No.: WO2022/044471
PCT Pub. Date: Mar. 3, 2022

(65) Prior Publication Data
US 2023/0266576 A1 Aug. 24, 2023

(30) Foreign Application Priority Data
Aug. 31, 2020 (JP) ................. 2020-146103

(51) Int. Cl.
G02B 21/00 (2006.01)
G02B 21/36 (2006.01)
(52) U.S. Cl.
CPC ..... *G02B 21/0028* (2013.01); *G02B 21/0032* (2013.01); *G02B 21/0056* (2013.01);
(Continued)
(58) Field of Classification Search
CPC ........... G02B 21/0028; G02B 21/0032; G02B 21/0056; G02B 21/008; G02B 21/006; G02B 21/361
(Continued)

(56) References Cited

U.S. PATENT DOCUMENTS

2011/0122488 A1 5/2011 Truong et al.
2016/0007847 A1 1/2016 Dziubak et al.
2020/0096313 A1* 3/2020 Kato ................. G01B 9/02063

FOREIGN PATENT DOCUMENTS

JP 2009-264787 A 11/2009
JP 2016-019635 A 2/2016
(Continued)

OTHER PUBLICATIONS

International Search Report issued in corresponding International Patent Application No. PCT/JP2021/020972 dated Aug. 24, 2021, with English translation.
(Continued)

*Primary Examiner* — Wyatt A Stoffa
*Assistant Examiner* — Mitchell T Oestreich
(74) *Attorney, Agent, or Firm* — Rimon P.C.

(57) ABSTRACT

The positional deviation of an imaging target due to the switching of image capture methods is suppressed. An image capture system includes a first image capture apparatus of an optical interference type and a second image capture apparatus of an optical sheet microscope type, wherein the first image capture apparatus includes a light source unit provided so as to be shared by the second image capture apparatus, a light concentrating unit provided so as to be shared by the second image capture apparatus, a reflecting unit, a branching unit, a synthesizing unit, a first detection unit configured to detect a spectral distribution of a synthetic light, and a calculation unit configured to calculate a boundary surface position in the imaging target, and the second image capture apparatus includes the light source unit, the light concentrating unit, and a second detection unit configured to detect fluorescence.

8 Claims, 5 Drawing Sheets

(52) U.S. Cl.
CPC ......... *G02B 21/006* (2013.01); *G02B 21/008* (2013.01); *G02B 21/361* (2013.01)

(58) Field of Classification Search
USPC .......................................................... 359/385
See application file for complete search history.

(56) References Cited

FOREIGN PATENT DOCUMENTS

| JP | 2018-189395 | A  | 11/2018 |
|----|-------------|----|---------|
| WO | 2008/052311 | A1 | 5/2008  |
| WO | 2017/213712 | A2 | 12/2017 |
| WO | 2018/231724 | A1 | 12/2018 |

OTHER PUBLICATIONS

M.J. Ju et al., "Multimodal analysis of pearls and pearl treatments by using optical coherence tomography and fluorescence spectroscopy", Optics Express, vol. 19, No. 7, Apr. 11, 2011, pp. 6420-6432.
Notice of Reasons for Refusal issued in corresponding Japanese Patent Application No. 2020-146103, dated Jan. 23, 2024 w/English Translation.

* cited by examiner

IMAGE CAPTURE SYSTEM

CROSS REFERENCE TO RELATED APPLICATIONS

This application is the U.S. National Phase under 35 US.C. § 371 of International Application No. PCT/JP2021/020972, filed on Jun. 2, 2021, which claims the benefit of Japanese Application No. 2020-146103, filed on Aug. 31, 2020, the entire contents of each are hereby incorporated by reference.

TECHNICAL FIELD

The technique disclosed in the specification of the present application relates to image capture systems.

BACKGROUND ART

As an apparatus allowing for the observation of a tomographic region of a living body or a translucent material in a non-contact and non-invasive manner, an optical coherence tomography (that is, OCT) apparatus has been put into practical use (see, for example, Patent Document 1).

In addition, as a technique allowing for the observation of a three-dimensional structure of a living body or the like, an image capture apparatus of an optical sheet microscope type which irradiates a sample stained with a fluorescent dye or a fluorescent protein with an excitation light formed in a sheet shape, thereby detecting fluorescence generated from an irradiation region of the light, has been widely used.

In the OCT observation, the external shape and the internal shape of an imaging target are observed, and in the fluorescence observation, the spatial distribution of a specific substance in a living body is observed. In addition, the OCT observation can be performed in a non-invasive manner, whereas the fluorescence observation is performed in an invasive manner in a case of staining with a fluorescent dye or the like. Therefore, these image capture methods are selectively used according to the purpose.

PRIOR ART DOCUMENT

Patent Document

Patent Document 1: Japanese Patent Application Laid-Open No. 2016-19635

SUMMARY

Problem to be Solved by the Invention

In a case where the OCT observation and the fluorescence observation are sequentially performed on the same imaging target, and imaging results obtained through both image capture methods are compared and evaluated, positional deviation (movement, rotation, or the like) of the imaging target occurs at the time of moving the imaging target between apparatuses. Since the positional deviation could also be a cause of error, the accuracy of comparison and evaluation may deteriorate.

The technique disclosed in the specification of the present application has been made in view of the problems as described above, and intends to suppress the positional deviation of an imaging target due to the switching of image capture methods.

Means to Solve the Problem

An image capture system according to a first aspect of the technique disclosed in the specification of the present application, includes: a first image capture apparatus of an optical interference type configured to capture an image of an imaging target; and a second image capture apparatus of an optical sheet microscope type configured to capture an image of the imaging target, wherein the first image capture apparatus includes: a light source unit provided so as to be shared by the second image capture apparatus; a light concentrating unit provided so as to be shared by the second image capture apparatus and configured to concentrate the light incoming on the imaging target; a reflecting unit configured to reflect the light incoming; a branching unit configured to divide light incoming from the light source unit such that a part of the light enters the reflecting unit and another part of the light enters the light concentrating unit; and a synthesizing unit configured to synthesize the light which has been reflected by the imaging target and has entered through the light concentrating unit, and the light which has been reflected by the reflecting unit and has entered, to emit a synthetic light; a first detection unit configured to detect a spectral distribution of the synthetic light; and a calculation unit configured to calculate a boundary surface position in the imaging target based on the spectral distribution of the synthetic light, and the second image capture apparatus includes: the light source unit; the light concentrating unit configured to concentrate the light incoming from the light source unit on the imaging target; and a second detection unit configured to detect fluorescence generated by the light which has been concentrated on the imaging target.

An image capture system according to a second aspect of the technique disclosed in the specification of the present application, is related to the image capture system according to the first aspect, and the light source unit includes a first light source configured to cause the light to enter the branching unit and a second light source configured to cause the light to enter the light concentrating unit.

An image capture system according to a third aspect of the technique disclosed in the specification of the present application, is related to the image capture system according to the first aspect, and the light concentrating unit includes a first objective lens and a second objective lens different from the first objective lens, and the first objective lens and the second objective lens are switchable in accordance with a wavelength of the light which enters the light concentrating unit.

An image capture system according to a fourth aspect of the technique disclosed in the specification of the present application, is related to the image capture system according to the second aspect, and the light concentrating unit causes a first objective lens to correspond to the light incoming from the first light source and causes a second objective lens different from the first objective lens to correspond to the light incoming from the second light source, and the first objective lens and the second objective lens are switchable in accordance with a wavelength of the light which enters the light concentrating unit.

An image capture system according to a fifth aspect of the technique disclosed in the specification of the present application, is related to the image capture system according to the first aspect, and an optical axis of the second detection unit is orthogonal to an optical axis of the light which has been concentrated on the imaging target by the light concentrating unit.

An image capture system according to a sixth aspect of the technique disclosed in the specification of the present application, is related to the image capture system according to the first aspect, and further includes a container configured to house the imaging target therein, wherein the container has a plurality of inner wall surfaces inclined with respect to a vertical direction, and the imaging target is placed at a bottom portion sandwiched between the plurality of inner wall surfaces.

An image capture system according to a seventh aspect of the technique disclosed in the specification of the present application, is related to the image capture system according to the first aspect, and further includes a container configured to house the imaging target therein, wherein the container has a plurality of outer wall surfaces, a first outer wall surface, of the plurality of outer wall surfaces, is orthogonal to an optical axis of the second detection unit, a second outer wall surface, of the plurality of outer wall surfaces, is orthogonal to an optical axis of the light which has been concentrated on the imaging target by the light concentrating unit.

An image capture system according to an eighth aspect of the technique disclosed in the specification of the present application, is related to the image capture system according to the first aspect, and further includes a scanning unit provided so as to be shared between the first image capture apparatus and the second image capture apparatus, and configured to perform scanning with the light which has been concentrated on the imaging target by the light concentrating unit.

Effects of the Invention

According to at least the first embodiment of the technique disclosed in the specification of the present application, since a light source and an object system are shared between image capture apparatuses, it is not necessary to move an imaging target even at the time of the switching of image capture methods in accordance with respective image capture apparatuses. Therefore, the positional deviation of an imaging target due to the switching of the image capture methods hardly occurs.

Furthermore, objects, features, aspects, and advantages relating to the technology disclosed in the specification of the present application will be more apparent from the following detailed description and the accompanying drawings.

DESCRIPTION OF EMBODIMENTS

Figure 1:
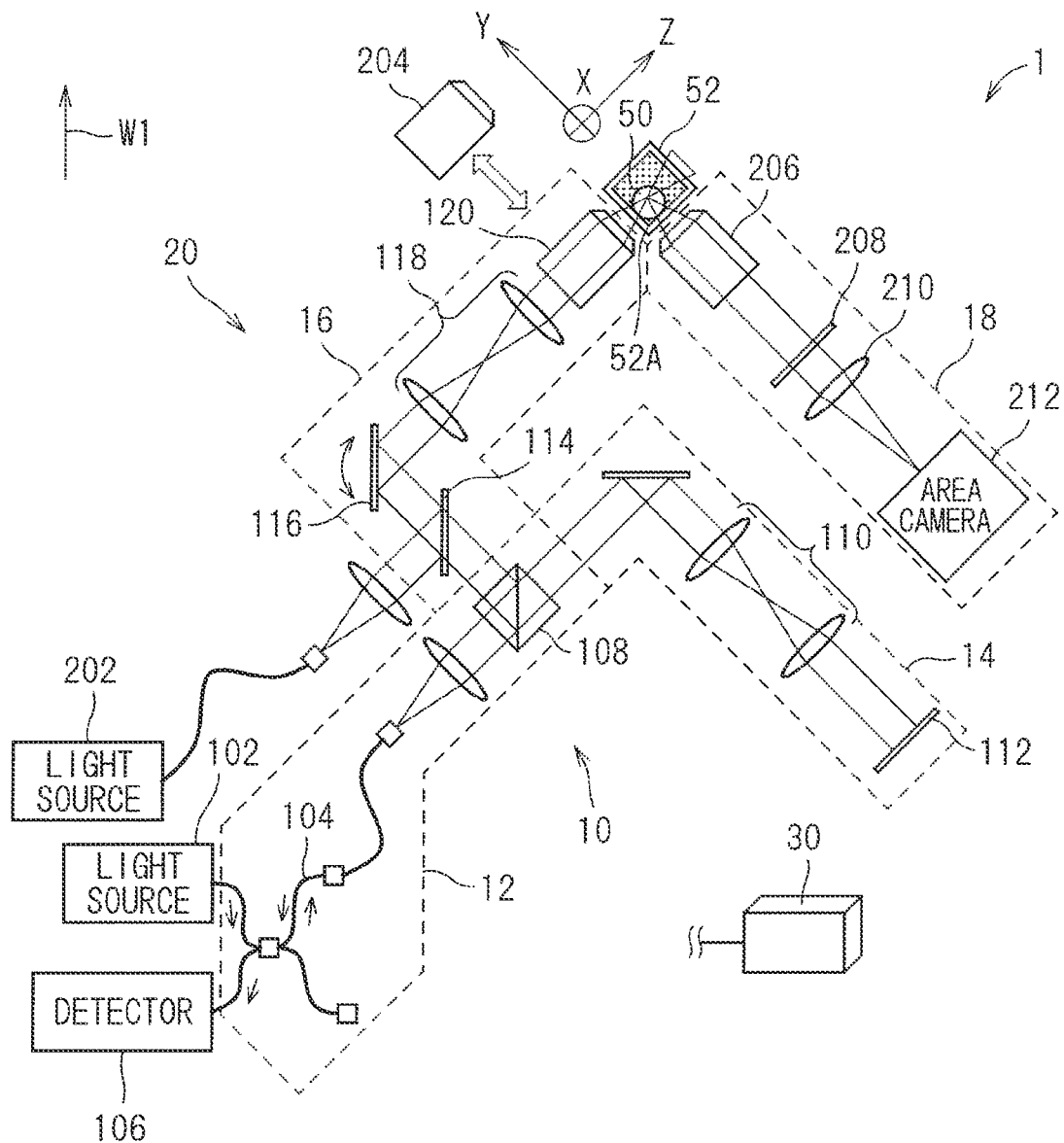
FIG. 1 is a diagram schematically illustrating an example of a configuration of an image capture system according to an embodiment.

Hereinafter, embodiments will be described with reference to the accompanying drawings. In the following embodiments, detailed features and the like are also shown for explaining the technique, but they are merely examples, and not all of them are necessarily essential features for the implementation of the embodiments. Furthermore, examples of effects produced by the respective embodiments will be collectively described after the explanation of all the embodiments.

Note that the drawings are schematically illustrated, and the configuration is appropriately omitted or simplified in the drawings for convenience of explanation. In addition, the mutual relation among the configurations and the like illustrated in different drawings in terms of the size and the position is not necessarily accurately described, and may be appropriately changed. Furthermore, hatching may be applied to not only cross-sectional views, but also plan views in order to facilitate understanding of the contents of the embodiment.

Besides, in the following explanation, similar components are denoted by the same reference numerals, and names and functions thereof are the same. Therefore, the detailed explanation thereof may be omitted in order to avoid duplication.

In addition, in the following explanation, the description of "comprising", "including", "having" a certain component is not an exclusive expression that excludes the presence of other components unless otherwise specified.

In addition, in the following explanation, even if ordinal numbers such as "first" or "second" are used, these terms are used for convenience in order to facilitate understanding of the contents of the embodiments, and are not limited to the order that may occur due to these ordinal numbers and the like.

In addition, in the following explanation, expressions indicating a relative or absolute positional relation, for example, "in one direction", "along one direction", "parallel", "orthogonal", "center", "concentric", or "coaxial" include a case where the positional relation is strictly indicated as well as a case where an angle or a distance is displaced within a range in which a tolerance or a similar function is obtained, unless otherwise specified.

In addition, in the following explanation, expressions indicating an equal state, for example, "same", "equal", "uniform", or "homogeneous" include a case indicating an exactly equal state as well as a case where a difference occurs within a range in which a tolerance or a similar function is obtained, unless otherwise specified.

In addition, in the following explanation, even when expressions meaning specific positions or directions such as "upper", "lower", "left", "right", "side", "bottom", "front", or "back" are used, these terms are used for convenience to facilitate understanding of the contents of the embodiments, and are not related to the positions or directions at the time of the actual implementation.

First Embodiment

Hereinafter, an image capture system according to the present embodiment will be described.
<Configuration of Image Capture System>

FIG. 1 is a diagram schematically illustrating an example of a configuration of an image capture system according to the present embodiment. As exemplified in FIG. 1, the image capture system 1 includes an image capture apparatus 10 of an optical interference type, an image capture apparatus 20 of an optical sheet microscope type, and a control unit that controls the image capture apparatus 10 and the image capture apparatus 20 via wireless or wired communication means.

One example of the image capture apparatus 10 of the optical interference type is an OCT. The OCT can perform the observation of a tomographic region of a living body or a translucent substance in a non-contact and non-invasive manner. The OCT detects a boundary surface position in a depth direction inside an imaging target such as a living body by using an optical interference phenomenon. Then, by performing the detection operation on a plurality of tomographic regions, it becomes possible to obtain a tomographic image of an imaging target and further obtain a three-dimensional structure of the imaging target. The OCT includes a Fourier domain OCT (FD-OCT), that is a method which has been put into practical use mainly in medical fields or industrial fields.

The image capture apparatus 10 includes a light source 102, a detector 106, a branching and synthesizing system 12 connected to the light source 102 and the detector 106, and a reference system 14 and an object system 16 branching off from the branching and synthesizing system 12.

The light source 102 is a broadband light source having a wide wavelength region such as a super luminescent diode (SLD) or a femtosecond laser, and for example, a light source in a near infrared region having a wavelength of 700 nm or more and 1300 nm or less is used.

The detector 106 is, for example, a spectroscope such as a diffraction grating. The detector 106 spectrally resolves an incoming interference light to detect a spectral distribution.

The branching and synthesizing system 12 includes a fiber coupler 104 connected to the light source 102 and the detector 106, and a beam splitter 108.

The fiber coupler 104 emits light incoming from the light source 102 to the beam splitter 108. In addition, the fiber coupler 104 emits light incoming from the beam splitter 108 side to the detector 106. When the fiber coupler 104 is configured to have so-called 2×2 type four ports, it is possible to respectively connect the reference system 14 and the object system 16 to the emission side, thereby forming the branching and synthesizing system 12 only by the fiber coupler 104.

The beam splitter 108 divides light emitted from the fiber coupler 104 and converted into a parallel light by a collimator or the like, into a branch for the reference system 14 and a branch for the object system 16, and then emits the resultant light. In addition, the beam splitter 108 synthesizes the light incoming from the reference system 14 and the light incoming from the object system 16, and then emits the resultant light to the fiber coupler 104.

In the reference system 14, the light divided by the beam splitter 108 is reflected by a mirror 112 via a relay lens 110. Then, the light reflected by the mirror 112 returns along the same optical path via the relay lens 110 and enters the beam splitter 108 as a reference light.

In the object system 16, the light divided by the beam splitter 108 transmits through a dichroic mirror 114, and enters the imaging target while being concentrated (for example, a state where light is concentrated at one point) via a galvanometer mirror 116, a relay lens 118, and an objective lens 120. Here, the imaging target is, for example, a sample 50 housed in a container 52 filled with a culture solution or the like. In addition, the outer wall surface of the container 52 is desirably orthogonal to the optical axis of the object system 16 so as not to be affected by the optical refraction. Specifically, the outer wall surface is desirable to be orthogonal to the optical axis of an objective lens 204. In other words, the outer wall surface is desirable to be orthogonal to the direction of light entering the container on the light incoming side.

Then, the light reflected inside the sample 50 returns along the same optical path via the objective lens 120, the relay lens 118, the galvanometer mirror 116, and the dichroic mirror 114, and then enters the beam splitter 108. Here, the objective lens 120 is provided so as to be replaceable with an objective lens 204 to be described later.

The reference light incoming from the reference system 14 and the light incoming from the object system 16 are synthesized by the beam splitter 108, and then the resultant light enters the detector 106 via the fiber coupler 104 as a synthetic light.

The image capture apparatus 20 includes a light source 202, the object system 16 shared by the image capture apparatus 10, and an observation system 18.

The light source 202 is, for example, a laser light source having a wavelength of an area between a near-ultraviolet region and a visible region.

The object system 16 is shared by the image capture apparatus 10, and light emitted from the light source 202 and converted into a parallel light by a collimator or the like is reflected by the dichroic mirror 114 placed between the beam splitter 108 and the galvanometer mirror 116, and then the resultant light enters the sample 50 that is an imaging target via the galvanometer mirror 116, the relay lens 118, and the objective lens 204. That is, the light from the light source 202 directly enters the object system 16.

Here, the objective lens 204 is provided so as to be replaceable with the objective lens 120, and includes, for example, a cylindrical lens. The light that enters the sample via the objective lens 204 is light narrowed only in the Y-axis direction, that is, light having a sheet-like distribution spreading in an XZ plane (hereinafter, it may be referred to as an optical sheet). The optical sheet is applied to an imaging target that has been stained with a fluorescent dye in advance or an imaging target that is a fluorescent protein, and generates fluorescence from the imaging target by exciting the imaging target located on the corresponding XZ plane. Note that the optical sheet may be substantially formed by forming light having a punctate distribution (a state where light is concentrated at one point) by the objective lens 204 or the like and then performing high-speed scanning (for example, scanning fast enough for a shutter speed of an area camera to be described later) on the sample 50 with the light in the X-axis direction.

The observation system 18 includes the objective lens 206 which receives the fluorescence generated from the sample 50 by the optical sheet, and an area camera 212 which receives the fluorescence that has entered the objective lens 206, via a band pass filter 208 and an image forming lens 210. Here, the band pass filter 208 is a filter that transmits only light having a specific wavelength.

The optical axis of the observation system 18 including the area camera 212 is orthogonal to the optical axis of the object system 16 including the objective lens 204. Here, the term "orthogonal" includes "substantially orthogonal" in which an angle is shifted within a tolerance range, and also includes a case where the angle is shifted within a range in which an image of the XZ plane can be captured at the same level. A focal position (specifically, the focal position of the objective lens 206) in the observation system 18 is adjusted to the XZ plane that is a light irradiation region. Here, the outer wall surface of the container 52 is desirably orthogonal to the optical axis of the observation system 18 so as not to be affected by the optical refraction. Specifically, the outer wall surface is desirable to be orthogonal to the optical axis of the objective lens 206. In other words, the outer wall surface is desirable to be orthogonal to the direction of light entering the container on the light incoming side. According to an image detected by the area camera 212 based on the fluorescence generated from the sample 50 in the XZ plane, it is possible to obtain two-dimensional position information and the like of the sample 50 which generates the fluorescence on this plane.

According to the image capture apparatus 20 of the optical sheet microscope type as described above, it is possible to obtain the two-dimensional position information and the like of the sample 50 on the XZ plane collectively from the image acquired by the area camera 212, thereby shortening the observation time and reducing the damage on the sample 50 due to the optical irradiation.

The control unit 30 may comprise: a storage device including a memory (storage medium) such as a hard disk drive (that is, HDD), a random access memory (that is, RAM), a read-only memory (that is, ROM), a flash memory, a volatile or nonvolatile semiconductor memory, a magnetic disk, a flexible disk, an optical disk, a compact disk, a mini disk, or a DVD; a processing circuit such as a central processing unit (that is, CPU) that executes a program stored in the storage device, an external CD-ROM, an external DVD-ROM, an external flash memory, or the like; an input device capable of inputting information, such as a mouse, a keyboard, a touch panel, and various switches; and an output device capable of outputting information, such as a display, a liquid crystal display, and a lamp.

Here, the image capture system 1 exemplified in FIG. 1 may be placed such that a direction W1 corresponds to the vertical direction. When the direction W1 corresponds to the vertical direction, the inner wall surface of the container 52 is inclined with respect to the direction W1, so that the sample 50 is fixed to a bottom portion 52A that is a corner of the container 52.

In this case, the objective lens 120 or the objective lens 204 and the objective lens 206 are placed so as to face the container 52 at a position where each objective lens looks up to the outer wall surface of the container 52.

Figure 2:
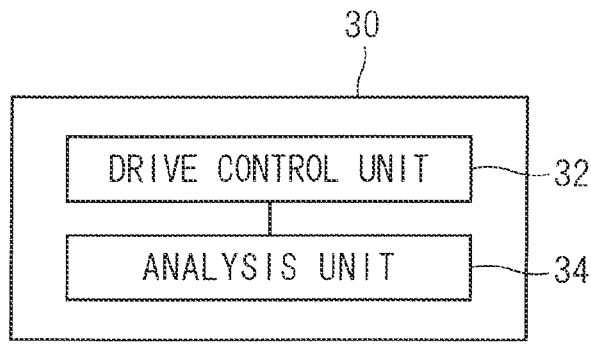
FIG. 2 is a diagram conceptually illustrating a functional configuration of a control unit.

FIG. 2 is a diagram conceptually illustrating a functional configuration of the control unit 30. As exemplified in FIG. 2, the control unit 30 includes a drive control unit 32 for controlling the driving of the image capture apparatus 10 and the driving of the image capture apparatus 20, and an analysis unit 34 for analyzing detection results and the like obtained by the image capture apparatus 10 and the image capture apparatus 20.

The drive control unit 32 controls the driving of the amount and wavelength region of light emitted from the light source 102, the mirror 112 of the reference system 14, the galvanometer mirror 116 and the objective lens 120 of the object system 16, the amount and wavelength region of light emitted from the light source 202, the objective lens 206 and the area camera 212 of the observation system 18, and the like. Note that the respective mechanisms are driven by corresponding drive mechanisms (not illustrated). As such a drive mechanism, a known mechanism such as a motor can be used.

The analysis unit 34 extracts data regarding a boundary surface position in the depth direction (a direction along the optical axis of the object system 16, that is, a direction along the Z-axis direction) in the sample 50 that is inherent in the spectral distribution of an interference light, by performing the Fourier transform on the data regarding the spectral distribution detected by the detector 106. Furthermore, the analysis unit 34 extracts two-dimensional position data of the sample 50 that generates fluorescence by analyzing data regarding an image detected by the area camera 212.

The image capture apparatus 10 detects a reflected and scattered light generated at a boundary surface of an imaging target. On the other hand, the image capture apparatus 20 detects fluorescence generated from a specific substance. That is, the external shape and the internal shape of the imaging target are observed in the image capture apparatus 10, whereas the spatial distribution of a specific substance in the imaging target is observed in the image capture apparatus 20.

Furthermore, the image capture apparatus 10 can perform the observation of an imaging target in a non-invasive manner. On the other hand, the image capture apparatus provides the observation in an invasive manner in a case where the imaging target is stained with a fluorescent dye. Therefore, in general, these image capture apparatuses are selectively used according to the purpose. However, as in the present embodiment, both of the image capture apparatus 10 and the image capture apparatus 20 may be used.

<Operation of Image Capture System>

Figure 3:
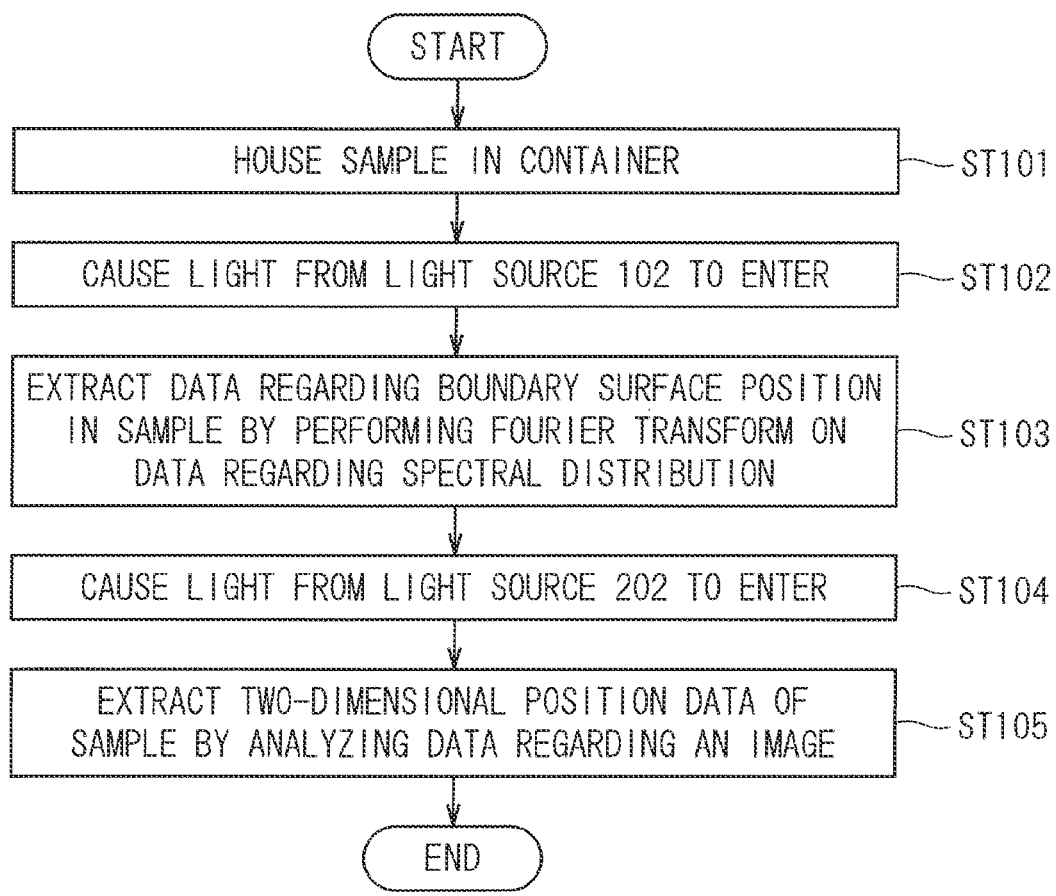
FIG. 3 is a flowchart illustrating an example of an operation of the image capture system according to the embodiment.

Next, an operation of the image capture system 1 according to the present embodiment will be described with reference to FIG. 3. FIG. 3 is a flowchart illustrating an example of an operation of the image capture system 1 according to an embodiment.

As exemplified in FIG. 3, in step ST101, a user houses the sample 50 in the container 52. At this time, the sample 50 is stained with a fluorescent dye if necessary.

Next, in step ST102, the control unit 30 causes light from the light source 102 to enter the branching and synthesizing system 12. Then, the control unit 30 divides the light in the branching and synthesizing system 12 and causes the resultant light to enter the reference system 14 and the object system 16, respectively. At this time, the control unit sets the objective lens 120, of the objective lens 120 and the objective lens 204 provided so as to be replaceable with each other in the object system 16, such that the objective lens 120 is located on the optical path of an incoming light.

Then, the control unit 30 causes the detector 106 to detect an interference light between light reflected by the mirror 112 in the reference system 14 and light reflected inside the sample 50 in the object system 16, in the branching and synthesizing system 12.

Next, in step ST103, the control unit 30 acquires data regarding the spectral distribution of the interference light detected by the detector 106. Furthermore, the control unit 30 extracts data regarding a boundary surface position in the depth direction in the sample 50 that is inherent in the spectral distribution of the interference light, by performing the Fourier transform on the data.

Next, in step ST104, the control unit 30 stops the emission of light from the light source 102 as well as causes light from the light source 202 to enter the object system 16. At this time, it is possible to use the sample 50 housed in the container 52 in step ST101 as it is without changing the placement thereof. Furthermore, at this time, the control unit sets the objective lens 204, of the objective lens 120 and the objective lens 204 provided so as to be replaceable with each other in the object system 16, such that the objective lens 204 is located on the optical path of an incoming light.

Then, the control unit 30 causes the area camera 212 to detect, as an image, fluorescence generated from the sample 50 by the optical sheet that enters the sample 50 via the objective lens 204.

Furthermore, in step ST105, the control unit 30 extracts two-dimensional position data of the sample 50 that generates fluorescence by acquiring the data regarding an image (fluorescence image) detected by the area camera 212 and also analyzing the data.

Note that, in the above explanation, the detection of the fluorescence image by the image capture apparatus 20 is performed after the detection of the interference light by the image capture apparatus 10, but the order of these detections may be reversed.

Figure 4:
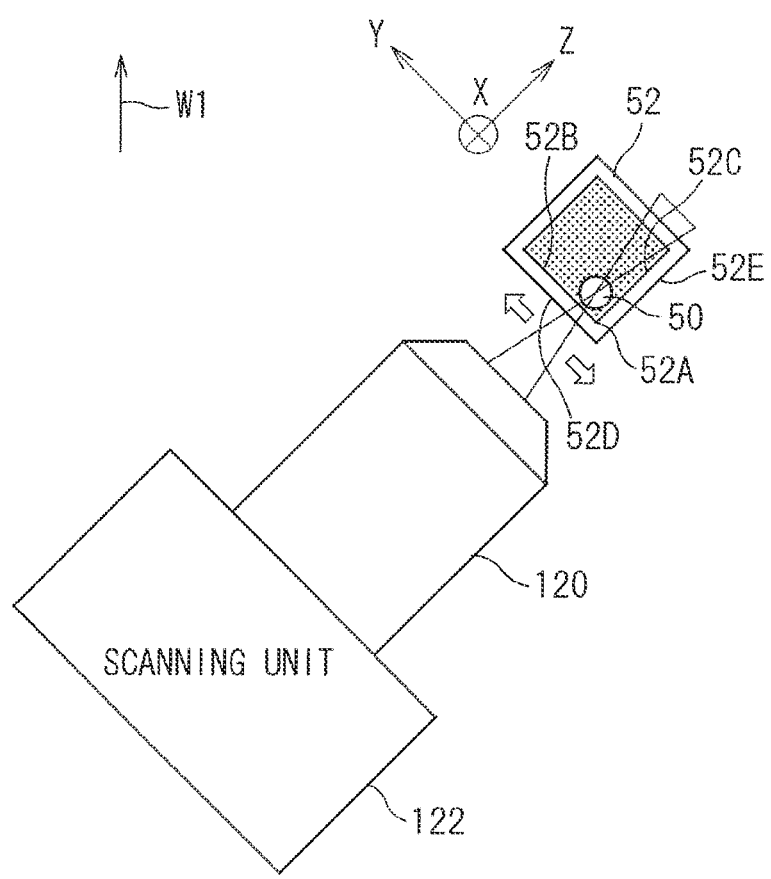
FIG. 4 is a diagram illustrating an example of a configuration of an objective lens and the periphery thereof in the image capture system exemplified in FIG. 1.

FIG. 4 is a diagram illustrating an example of a configuration of the objective lens 120 and the periphery thereof in the image capture system 1 exemplified in FIG. 1. FIG. 4 illustrates a state in which the objective lens 120 is located on the optical path of an incoming light in the object system 16 of the image capture system 1 exemplified in FIG. 1.

As exemplified in FIG. 4, light concentrated at one point by the objective lens 120 may be scanned, on the XY plane, by a scanning unit 122. The scanning by the scanning unit 122 is achievable, for example, through a method for changing the light incoming position by use of an optical component that changes the optical path such as a galvanometer mirror, or through a method for moving at least one of the container 52 and the objective lens 120 on the XY plane to change the relative position thereof.

Here, when the direction W1 corresponds to the vertical direction, an inner wall surface 52B and an inner wall surface 52C of the container 52 are inclined with respect to the direction W1, so that the sample 50 is fixed to the bottom portion 52A that is a corner sandwiched by the inner wall surface 52B and the inner wall surface 52C.

In addition, an outer wall surface 52D of the container 52 is desirably orthogonal to the optical axis of light which has been concentrated on the sample 50 by the object system 16 so as not to be affected by the optical refraction.

Through the spectral distribution having a plurality of points detected by the scanning as described above, it is possible to create a tomographic image of the sample 50.

Figure 5:
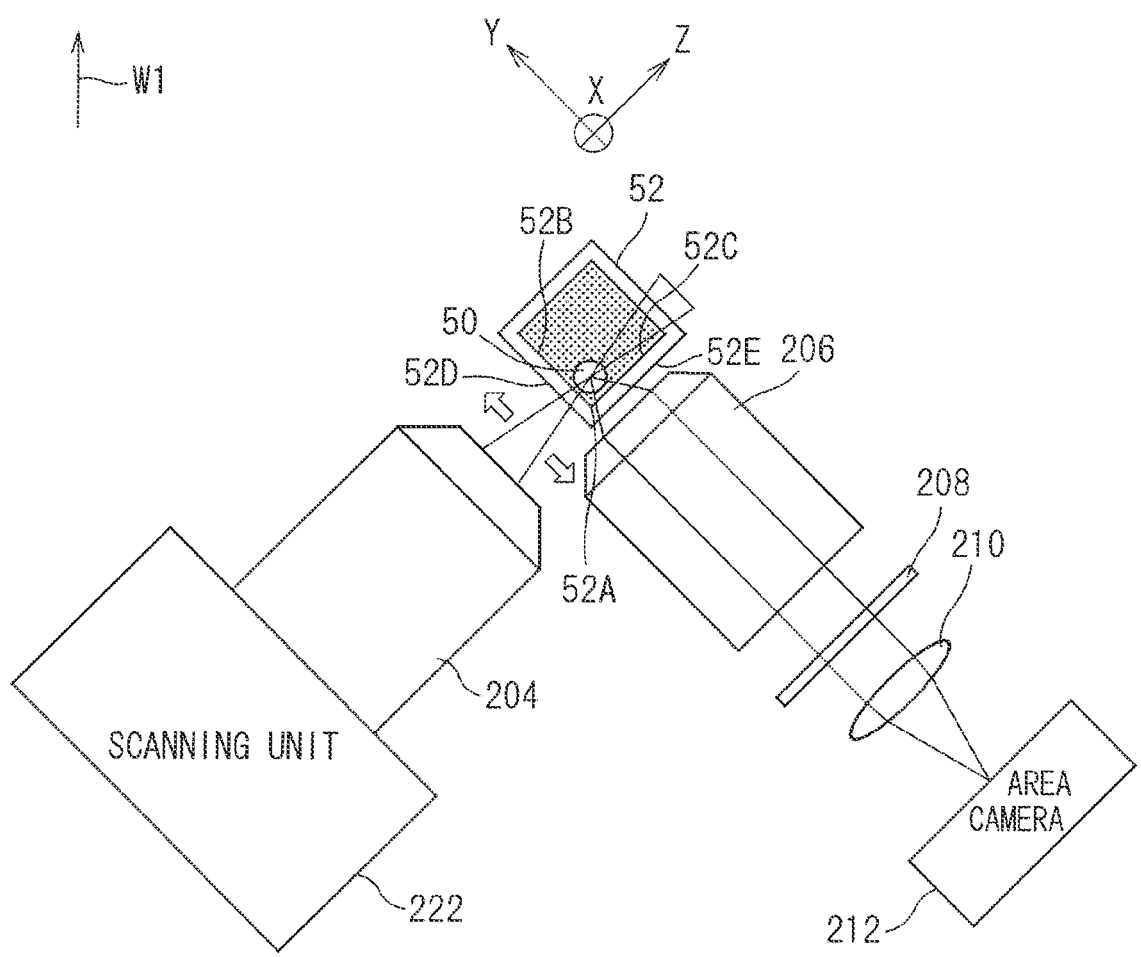
FIG. 5 is a diagram illustrating an example of a configuration of an objective lens and the periphery thereof in the image capture system exemplified in FIG. 1.

FIG. 5 is a diagram illustrating an example of a configuration of the objective lens 204 and the periphery thereof in the image capture system 1 exemplified in FIG. 1. FIG. 5 illustrates a state in which the objective lens 204 is located on the optical path of an incoming light in the object system 16 of the image capture system 1 exemplified in FIG. 1.

As exemplified in FIG. 5, an optical sheet concentrated by the objective lens 204 may be scanned, in the Y-axis direction, by a scanning unit 222. The scanning by the scanning unit 222 is achievable, for example, through a method for changing the light incoming position by use of an optical component that changes the optical path such as a galvanometer mirror, or through a method for moving at least one of the container 52 and the objective lens 204 in the Y-axis direction to change the relative position thereof.

Here, the focal position in the observation system 18 is adjusted to the XZ plane that is a light irradiation region, but in a case where the light irradiation region moves in the Y-axis direction by the abovementioned scanning, the control unit 30 also moves the focal position of the observation system 18 in accordance with the light irradiation region.

When the direction W1 corresponds to the vertical direction, the objective lens 204 is placed so as to face the container 52 at a position where the objective lens 204 looks up to the outer wall surface 52D of the container 52. Similarly, the objective lens 206 is placed so as to face the container 52 at a position where the objective lens 206 looks up to the outer wall surface 52E of the container 52.

In addition, the outer wall surface 52D of the container 52 is desirably orthogonal to the optical axis of the object system 16 so as not to be affected by the optical refraction. Similarly, the outer wall surface 52E of the container 52 is desirably orthogonal to the optical axis of the observation system 18 so as not to be affected by the optical refraction.

Note that the scanning unit 222 may be identical to the scanning unit 122. That is, one scanning unit may be used for optical scanning in the image capture apparatus 10 and optical scanning in the image capture apparatus 20. In that case, the scanning unit can switch the scanning method for the optical scanning in the image capture apparatus 10 and the scanning method for the optical scanning in the image capture apparatus 20.

Through a fluorescence image having a plurality of surfaces detected by the scanning as described above, it is possible to create a three-dimensional image of the sample 50. The resolution in the Y-axis direction at this time depends on the thickness of the optical sheet in the Y-axis direction.

According to the present embodiment, it is possible to perform image capture as the image capture apparatus 10 and image capture as the image capture apparatus 20 without moving the sample 50. Therefore, it is not necessary to consider the positional deviation of the sample 50 or the like when detection results (analysis results) obtained through the image capture performed by both of the apparatuses are compared. Therefore, it is possible to compare the detection results of both of the apparatuses easily and with a high degree of accuracy.

Furthermore, since the image capture apparatus 10 and the image capture apparatus 20 share the object system 16, it is possible to promote the downsizing of the system configuration.

Second Embodiment

An image capture system according to the present embodiment will be described. Note that, in the following explanation, components similar to those explained in the abovementioned embodiment are denoted by the same reference numerals, and the detailed explanation thereof is omitted as appropriate.

<Configuration of Image Capture System>

Figure 6:
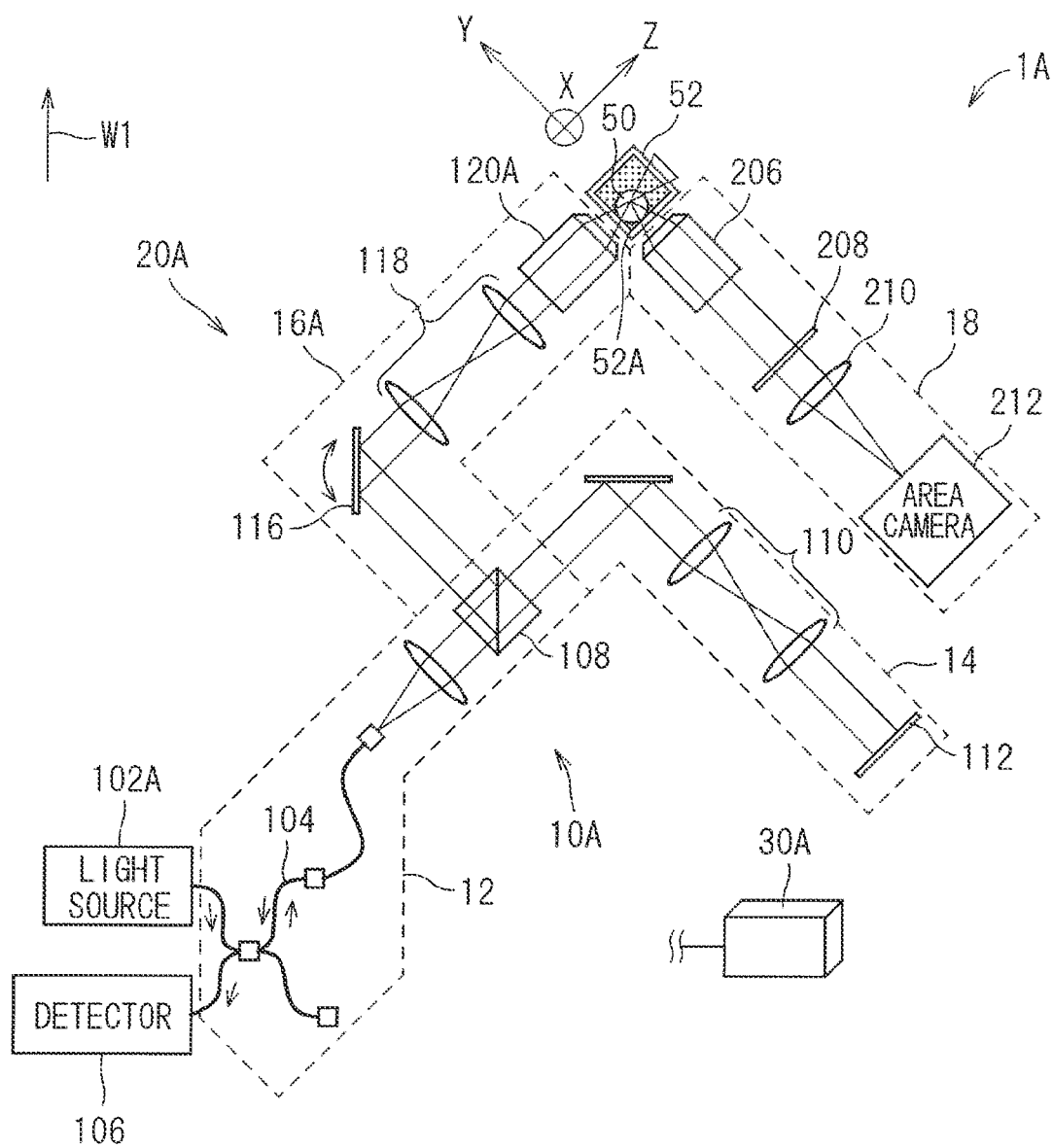
FIG. 6 is a diagram schematically illustrating an example of a configuration of the image capture system according to the embodiment.

FIG. 6 is a diagram schematically illustrating an example of a configuration of an image capture system according to the present embodiment. As exemplified in FIG. 6, an image capture system 1A includes an image capture apparatus 10A of an optical interference type, an image capture apparatus 20A of an optical sheet microscope type, and a control unit 30A that controls the image capture apparatus 10A and the image capture apparatus 20A via wireless or wired communication means.

One example of the image capture apparatus 10A of the optical interference type is an OCT. The image capture apparatus 10A includes a light source 102A, the detector 106, the branching and synthesizing system 12 connected to the light source 102A and the detector 106, and the reference system 14 and an object system 16A branching off from the branching and synthesizing system 12.

The light source 102A is, for example, a light source that emits light having a wavelength variable in a wide wavelength region between a near-ultraviolet region and a near-infrared light region.

In the object system 16A, the light divided by the beam splitter 108 enters an imaging target while being concentrated (for example, a state where light is concentrated at one point) via the galvanometer mirror 116, the relay lens 118, and an objective lens 120A.

Then, the light reflected inside the sample 50 returns along the same optical path via the objective lens 120A, the relay lens 118, and the galvanometer mirror 116, and then enters the beam splitter 108.

The reference light incoming from the reference system 14 and the light incoming from the object system 16A are synthesized by the beam splitter 108, and then the resultant light enters the detector 106 via the fiber coupler 104 as a synthetic light.

The image capture apparatus 20A includes the light source 102A shared by the image capture apparatus 10A, the object system 16A shared by the image capture apparatus 10, and the observation system 18.

The object system 16A is shared by the image capture apparatus 10, and light emitted from the light source 102A shared by the image capture apparatus 10A and converted into a parallel light by a collimator or the like is reflected by the beam splitter 108, and then the resultant light enters the sample 50 via the galvanometer mirror 116, the relay lens 118, and the objective lens 120A.

Here, the light that enters the sample 50 via the objective lens 120A is light narrowed only in the Y-axis direction, that is, an optical sheet having a sheet-like distribution spreading in an XZ plane. Note that the optical sheet is formed by forming light having a punctate distribution (a state where light is concentrated at one point) similarly to the case where the objective lens 120A operates as an object system 16A in the image capture apparatus 10A and then performing high-speed scanning on the sample 50 with the light in the X-axis direction.

The optical axis of the observation system 18 including the area camera 212 is orthogonal to the optical axis of the object system 16A including the objective lens 120A. The focal position in the observation system 18 is adjusted to the XZ plane that is a light irradiation region.

The control unit 30A may comprise: a storage device including a memory (storage medium) such as a HDD, a RAM, a ROM, a flash memory, a volatile or nonvolatile semiconductor memory, a magnetic disk, a flexible disk, an optical disk, a compact disk, a mini disk, or a DVD; a processing circuit such as a CPU that executes a program stored in the storage device, an external CD-ROM, an external DVD-ROM, an external flash memory, or the like; an input device capable of inputting information, such as a mouse, a keyboard, a touch panel, and various switches; and an output device capable of outputting information, such as a display, a liquid crystal display, and a lamp.

Figure 7:
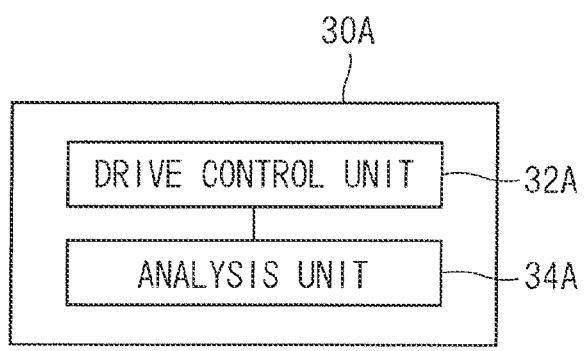
FIG. 7 is a diagram conceptually illustrating a functional configuration of a control unit.

FIG. 7 is a diagram conceptually illustrating a functional configuration of the control unit 30A. As exemplified in FIG. 7, the control unit 30A includes a drive control unit 32A for controlling the driving of the image capture apparatus 10A and the driving of the image capture apparatus 20A, and an analysis unit 34A for analyzing detection results and the like obtained by the image capture apparatus 10A and the image capture apparatus 20A.

The drive control unit 32A controls the driving of the amount and wavelength region of light emitted from the light source 102A, the mirror 112 of the reference system 14, the galvanometer mirror 116 and the objective lens 120A of the object system 16A, the objective lens 206 and the area camera 212 of the observation system 18, and the like. Note that the respective mechanisms are driven by corresponding drive mechanisms (not illustrated). As such a drive mechanism, a known mechanism such as a motor can be used.

The analysis unit 34A extracts data regarding a boundary surface position in the depth direction in the sample 50 that is inherent in the spectral distribution of an interference light, by performing the Fourier transform on the data regarding the spectral distribution detected by the detector 106. Furthermore, the analysis unit 34A extracts two-dimensional position data of the sample 50 that generates fluorescence by analyzing data regarding an image detected by the area camera 212.

<Operation of Image Capture System>

Next, an operation of the image capture system 1A according to the present embodiment will be described. In the image capture system 1A according to the present embodiment, by adjusting a wavelength region of light emitted from the light source 102A and a corresponding scanning method, image capture as the image capture apparatus 10A and image capture as the image capture apparatus 20A are selectively used.

Specifically, in a case of performing image capture as the image capture apparatus 10A, the control unit 30A sets a wavelength region of light emitted from the light source 102A to, for example, a wavelength between 700 nm or more and 1300 nm or less. Then, the light from the light source 102A is caused to enter the branching and synthesizing system 12. The control unit 30A divides the light in the branching and synthesizing system 12 and causes the resultant light to enter the reference system 14 and the object system 16A, respectively.

Then, the control unit 30A causes the detector 106 to detect an interference light between light reflected by the mirror 112 in the reference system 14 and light reflected inside the sample 50 in the object system 16A, in the branching and synthesizing system 12.

On the other hand, in a case of performing image capture as the image capture apparatus 20A, the control unit 30A sets a wavelength region of light emitted from the light source 102A to, for example, an area between a near-ultraviolet region and a visible region. Then, the light from the light source 102A is caused to enter the branching and synthesizing system 12.

The control unit 30A causes the area camera 212 to detect, as an image, fluorescence caused to enter the sample 50 via the objective lens 120A, and generated by an optical sheet used for scanning by the scanning unit 222 as exemplified in FIG. 5 or the like.

Note that it is possible to use the sample 50 housed in the container 52 as it is without changing the placement at the time of performing image capture as the image capture apparatus 10A and at the time of performing image capture as the image capture apparatus 20A.

According to the present embodiment, it is possible to perform image capture as the image capture apparatus 10A and image capture as the image capture apparatus 20A without moving the sample 50. Therefore, it is not necessary to consider the positional deviation of the sample 50 or the like when detection results (analysis results) obtained through the image capture performed by both of the apparatuses are compared. Therefore, it is possible to compare the detection results of both of the apparatuses easily and with a high degree of accuracy.

Furthermore, since the image capture apparatus 10A and the image capture apparatus 20A share the light source 102A that emits light having a variable wavelength, and the object system 16A, it is possible to promote the downsizing of the system configuration.

<Effects Produced by Embodiments Described Above>

Next, examples of the effects produced by the embodiments described above are shown. Note that, in the following description, the effects will be described based on the specific configuration exemplified in the embodiments described above, but may be replaced with other specific configurations exemplified in the specification of the present application as long as similar effects are produced.

Furthermore, such replacement may be performed across a plurality of embodiments. That is, the same effect may be produced by combining the respective configurations exemplified in different embodiments.

According to the embodiments described above, the image capture system includes a first image capture apparatus of an optical interference type and a second image capture apparatus of an optical sheet microscope type. Here, the first image capture apparatus corresponds to, for example, any one of the image capture apparatus 10, the image capture apparatus 10A, and the like (hereinafter, for convenience, any one of these may be described in a corresponding manner). Here, the second image capture apparatus corresponds to, for example, any one of the image capture apparatus 20, the image capture apparatus 20A, and the like (hereinafter, for convenience, any one of these may be described in a corresponding manner). The image capture apparatus 10A captures an image of an imaging target. Here, the imaging target corresponds to, for example, the sample 50. The image capture apparatus 20A also captures an image of the sample 50. The image capture apparatus 10A includes a light source unit, a light concentrating unit, a reflecting unit, a branching unit, a synthesizing unit, a first detection unit, and a calculation unit. Here, the light source unit corresponds to, for example, any one of the light source 102, the light source 102A, the light source 202, and the like (hereinafter, for convenience, any one of these may be described in a corresponding manner). In addition, the light concentrating unit corresponds to, for example, any one of the object system 16, the object system 16A, and the like (hereinafter, for convenience, any one of these may be described in a corresponding manner). The reflecting unit corresponds to, for example, the reference system 14. The branching unit and the synthesizing unit correspond to, for example, the branching and synthesizing system 12. The first detection unit corresponds to, for example, the detector 106. The calculation unit corresponds to, for example, any one of the control unit 30, the control unit 30A, and the like (hereinafter, for convenience, any one of these may be described in a corresponding manner). The light source 102A is provided so as to be shared by the image capture apparatus 20A. The object system 16A is provided so as to be shared by the image capture apparatus 20A. The object system 16A concentrates an incoming light on the sample 50. The reference system 14 reflects the incoming light. The branching and synthesizing system 12 divides light incoming from the light source 102A such that a part thereof enters the reference system 14 and the other part thereof enters the object system 16A. In addition, the branching and synthesizing system 12 synthesizes the light incoming through the object system 16A after being reflected by the sample 50 and the light incoming after being reflected by the reference system 14, and then emits the synthetic light. The detector 106 detects a spectral distribution of the synthetic light (interference light). The control unit 30A calculates a boundary surface position in the sample 50 based on the spectral distribution of the synthetic light. On the other hand, the image capture apparatus 20A includes the light source 102A, the object system 16A, and a second detection unit. Here, the second detection unit corresponds to, for example, the observation system 18. The object system 16A concentrates light incoming from the light source 102A on the sample 50. The observation system 18 detects fluorescence generated by the light condensed on the sample 50.

According to such a configuration, since the light source 102A and the object system 16A are provided so as to be shared between the image capture apparatus 10A and the image capture apparatus 20A, it is not necessary to move the sample 50 even at the time of the switching of image capture methods in accordance with respective image capture apparatuses. Therefore, the positional deviation of the sample 50 due to the switching of the image capture methods hardly occurs, and it is possible to easily compare the image capture results between the image captures. Furthermore, since the light source 102A and the object system 16A are provided so as to be shared between the image capture apparatus 10A and the image capture apparatus 20A, it is possible to downsize the entire configuration of the image capture system.

Note that, in a case where another configuration exemplified in the specification of the present application is appropriately added to the above configuration, that is, even in a case where another configuration that is not mentioned as the above configuration in the specification of the present application is appropriately added thereto, it is possible to obtain similar effects.

Additionally, according to the embodiments described above, the light source unit includes a first light source that causes light to enter the branching and synthesizing system 12 and a second light source that causes light to enter the object system 16. Here, the first light source corresponds to, for example, the light source 102. Besides, the second light source corresponds to, for example, the light source 202. According to such a configuration, by providing light sources specific to respective image capture methods, it is possible to easily switch between image capture as the image capture apparatus 10 of the optical interference type and image capture as the image capture apparatus 20 of the optical sheet microscope type.

Besides, according to the embodiments described above, the object system 16 includes a first objective lens and a second objective lens that differs from the objective lens 120. Here, the first objective lens corresponds to, for example, the objective lens 120. Besides, the second objective lens corresponds to, for example, the objective lens 204. The objective lens 120 and the objective lens 204 can be switched in accordance with the wavelength of light which enters the object system 16. According to such a configuration, by changing objective lenses in accordance with the wavelength of light emitted from a light source to the object system 16, it is possible to easily switch between image capture as the image capture apparatus 10 of the optical interference type and image capture as the image capture apparatus 20 of the optical sheet microscope type.

Furthermore, according to the embodiments described above, the object system 16 causes the objective lens 120 to correspond to light incoming from the light source 102, and causes the objective lens 204 different from the objective lens 120 to correspond to light incoming from the light source 202. Here, the objective lens 120 and the objective lens 204 can be switched in accordance with the wavelength of light which enters the object system 16. According to such a configuration, by changing objective lenses in accordance with switching between the light source 102 and the light source 202, it is possible to easily switch between image capture as the image capture apparatus 10 of the optical interference type and image capture as the image capture apparatus 20 of the optical sheet microscope type.

In addition, according to the embodiments described above, the optical axis of the observation system 18 is orthogonal to the optical axis of light concentrated on the sample 50 by the object system 16A. According to such a configuration, it is possible to appropriately acquire an image of the XZ plane of the sample 50 in which fluorescence is generated by an optical sheet, and obtain two-dimensional position information of a fluorescent substance on the plane.

Furthermore, according to the embodiments described above, the image capture system includes the container 52 that houses the sample 50 therein. The container 52 has a plurality of inner wall surfaces (an inner wall surface 52B, an inner wall surface 52C) inclined with respect to the vertical direction. The sample 50 is placed at the bottom portion 52A sandwiched between the inner wall surface 52B and the inner wall surface 52C. According to such a configuration, since the sample 50 is fixed to a corner of the container 52, the positional deviation of the sample 50 hardly occurs. Therefore, the positional deviation of the sample 50 due to the switching of the image capture methods hardly occurs, and it is possible to easily compare the image capture results between the image captures.

Furthermore, according to the embodiments described above, the image capture system includes the container 52 that houses the sample 50 therein. The container 52 has a plurality of outer wall surfaces (an outer wall surface 52D, an outer wall surface 52E). Of the outer wall surface 52D and the outer wall surface 52E, the outer wall surface 52E serving as a first outer wall surface is orthogonal to the optical axis of the observation system 18. Furthermore, of the outer wall surface 52D and the outer wall surface 52E, the outer wall surface 52D serving as a second outer wall surface is orthogonal to the optical axis of light concentrated on the sample 50 by the object system 16A. According to such a configuration, it is possible to suppress the influence of the refraction of light on a wall surface of the container 52 and to suppress an error that may occur in the optical path length or the like.

Furthermore, according to the embodiments described above, the image capture system includes the scanning unit 122 (or the scanning unit 222). The scanning unit 122 is provided so as to be shared between the image capture apparatus 10A and the image capture apparatus 20A, and the scanning unit 122 performs scanning with light concentrated on the sample 50 by the object system 16A. According to such a configuration, it is possible to acquire a spectral distribution at a plurality of points in the sample 50 or to acquire a fluorescence image on a plurality of planes of the sample 50.

<Modifications of Embodiments Described Above>

In the embodiments described above, material properties, materials, dimensions, shapes of components, relative placement relation therebetween, a condition for implementing these components, or the like may also be described, but each of these is merely one example in all aspects and is not restrictive.

Accordingly, numerous modifications and equivalents, examples of which are not shown, are conceived of within the scope of the technology disclosed in the specification of the present application. For example, a case where at least one component is modified, added, or omitted, and a case where at least one component in at least one embodiment is extracted and combined with a component in another embodiment, are included.

In addition, in the embodiments described above, in a case where the name of a material is described without being particularly specified, as far as no contradiction arises, the material includes other additives, for example, an alloy or the like.

Besides, as far as no contradiction arises, as for a component that is described as "one" component provided in the embodiments described above, "more than one" such components may be provided.

Furthermore, each component in the embodiments described above is a conceptual unit, and the scope of the technology disclosed in the specification of the present application includes a case where one component is configured by a plurality of structures, a case where one component corresponds to a part of a certain structure, and a case where a plurality of components are provided in a single structure.

In addition, each component in the embodiments described above includes a structure having another structure or shape as long as the same function is exhibited.

Besides, the explanation in the specification of the present application is referred to for all purposes related to the present technique, and none of them is recognized as conventional art.

EXPLANATION OF REFERENCE SIGNS

1, 1A: image capture system
10, 10A, 20, 20A: image capture apparatus
12: branching and synthesizing system
14: reference system
16, 16A: object system
18: observation system
30, 30A: control unit
32, 32A: drive control unit
34, 34A: analysis unit
50: sample
52: container
52A: bottom portion
52B, 52C: inner wall surface
52D, 52E: outer wall surface
102, 102A, 202: light source
104: fiber coupler
106: detector
108: beam splitter
110, 118: relay lens
112: mirror
114: dichroic mirror
116: galvanometer mirror
120, 120A, 204, 206: objective lens
122, 222: scanning unit
208: bandpass filter
210: image forming lens
212: area camera

The invention claimed is:

1. An image capture system comprising:
a first image capture apparatus of an optical interference type configured to capture an image of an imaging target; and
a second image capture apparatus of an optical sheet microscope type configured to capture an image of said imaging target, wherein said first image capture apparatus includes:
- a light source unit provided so as to be shared by said second image capture apparatus;
- a light concentrating unit provided so as to be shared by said second image capture apparatus and configured to concentrate light incoming on said imaging target;
- a reflecting unit configured to reflect said light incoming;
- a branching unit configured to divide light incoming from said light source unit such that a part of said light enters said reflecting unit and another part of said light enters said light concentrating unit;
- a synthesizing unit configured to synthesize said light which has been reflected by said imaging target and has entered through said light concentrating unit, and said light which has been reflected by said reflecting unit and has entered, to emit a synthetic light;
- a first detection unit configured to detect a spectral distribution of said synthetic light; and
- a calculation unit configured to calculate a boundary surface position in said imaging target based on said spectral distribution of said synthetic light, and said second image capture apparatus includes:
- said light source unit;
- said light concentrating unit configured to concentrate said light incoming from said light source unit on said imaging target; and
- a second detection unit configured to detect fluorescence generated by said light which has been concentrated on said imaging target.

2. The image capture system according to claim 1, wherein
said light source unit comprises a first light source configured to cause said light to enter said branching unit and a second light source configured to cause said light to enter said light concentrating unit.

3. The image capture system according to claim 1, wherein
said light concentrating unit comprises a first objective lens and a second objective lens different from said first objective lens, and
said first objective lens and said second objective lens are switchable in accordance with a wavelength of said light which enters said light concentrating unit.

4. The image capture system according to claim 2, wherein
said light concentrating unit causes a first objective lens to correspond to said light incoming from said first light source and causes a second objective lens different from said first objective lens to correspond to said light incoming from said second light source, and
said first objective lens and said second objective lens are switchable in accordance with a wavelength of said light which enters said light concentrating unit.

5. The image capture system according to claim 1, wherein
an optical axis of said second detection unit is orthogonal to an optical axis of said light which has been concentrated on said imaging target by said light concentrating unit.

6. The image capture system according to claim 1, further comprising a container configured to house said imaging target therein, wherein
said container has a plurality of inner wall surfaces inclined with respect to a vertical direction, and
said imaging target is placed at a bottom portion sandwiched between said plurality of inner wall surfaces.

7. The image capture system according to claim 1, further comprising a container configured to house said imaging target therein, wherein
said container has a plurality of outer wall surfaces,
a first outer wall surface, of said plurality of outer wall surfaces, is orthogonal to an optical axis of said second detection unit,
a second outer wall surface, of said plurality of outer wall surfaces, is orthogonal to an optical axis of said light which has been concentrated on said imaging target by said light concentrating unit.

8. The image capture system according to claim 1, further comprising a scanning unit provided so as to be shared between said first image capture apparatus and said second image capture apparatus, and configured to perform scanning with said light which has been concentrated on said imaging target by said light concentrating unit.

* * * * *